Feb. 9, 1926.

H. W. SMITH 1,572,693

MACHINE FOR MAKING LINK MESH

Filed Feb. 14, 1924

INVENTOR
Harry W. Smith
BY
Pennie, Davis, Marvin & Edmonds
his ATTORNEYS

Feb. 9, 1926.

H. W. SMITH 1,572,693

MACHINE FOR MAKING LINK MESH

Filed Feb. 14, 1924  7 Sheets-Sheet 2

INVENTOR
Harry W. Smith
BY
his ATTORNEYS

Feb. 9, 1926.                                                    1,572,693
H. W. SMITH
MACHINE FOR MAKING LINK MESH
Filed Feb. 14, 1924         7 Sheets-Sheet 3

INVENTOR
Harry W. Smith
BY
Pennie, Davis, Marvin & Edmonds
his ATTORNEYS

Feb. 9, 1926.

H. W. SMITH

MACHINE FOR MAKING LINK MESH

Filed Feb. 14, 1924　　7 Sheets-Sheet 7

INVENTOR
Harry W. Smith
BY
Pennie, Davis, Marvin & Edmonds
His ATTORNEYS

Patented Feb. 9, 1926.

1,572,693

UNITED STATES PATENT OFFICE.

HARRY W. SMITH, OF CONIMICUT, RHODE ISLAND, ASSIGNOR TO WHITING & DAVIS COMPANY, A CORPORATION OF MASSACHUSETTS.

MACHINE FOR MAKING LINK MESH.

Application filed February 14, 1924. Serial No. 692,719.

*To all whom it may concern:*

Be it known that I, HARRY W. SMITH, a citizen of the United States, residing at Conimicut, in the county of Kent, State of Rhode Island, have invented certain new and useful Improvements in Machines for Making Link Mesh; and I do hereby declare the following to be a full, clear, and exact description of the invention, such as will enable others skilled in the art to which it appertains to make and use the same.

This invention relates to a method of making link mesh fabric, such as is widely used in the manufacture of ladies' hand bags and other similar articles of jewelry, and also to a machine by which this method may be practiced. More specifically, the invention is directed to the provision of a method by which mesh may be made of links having their ends soldered together and by this method such link mesh may be made of non-solder core wire.

In making soldered mesh, the methods and apparatus commonly employed have involved the use of wire which has soldering material incorporated within it in the form of a core. Lengths of this wire are bent into the form of staples, the staples inserted through links at the edge of the piece of mesh, and then closed to form rings or links. The link forming operation is carried on until a piece of mesh of the desired length has been produced and then the piece of mesh is removed from the machine and subjected to a heat treatment, whereupon the solder incorporated in the wire softens and unites so that the ends of the link are joined together, each link thus being an uninterrupted ring of metal.

The present invention is directed to the provision of a method and apparatus by which such mesh may be made of plain wire without solder content, and in order that the links of the mesh may be soldered together, a disc of solder of appropriate dimensions is inserted between the ends of each link as these ends are bent together to form a ring. The discs of solder are stamped or punched from a strip which is advanced step by step in coordination with the link forming tools, and these discs punched from the flat strip are advanced by appropriate mechanism so as to lie in the path of the ends of the links as those ends approach each other in the forming operation. These discs are punched so as to have their opposite faces concaved and the ends of the links are forced firmly against the faces of the disc so that the latter is held securely in position, the concaved faces assisting in preventing the displacement of the piece of solder from between the ends of the link. The operations of feeding the solder, stamping the discs and moving these discs to their appropriate position, are properly timed with the operation of the link forming tools so that a disc of solder is inserted in each link. When a piece of this mesh of sufficient length has been produced it is removed from the machine and placed in a suitable furnace. Here the mesh is heated as in the former process, so as to cause the discs of solder to soften and unite the ends of the links so that each link in the mesh has its ends soldered together and is continuous. Mesh made according to this process is much stronger than ordinary unsoldered mesh and is considerably cheaper than soldered mesh as heretofore made, since it is not necessary to use solder core wire which is much more expensive than the plain wire which may be utilized in this process.

While the principles of this invention may be embodied in any of the several types of machines now used for making link mesh, such, for instance, as machines which produce the mesh a link at a time, machines which add a row of links to the mesh at each operation of the tools, machines which produce mesh in the form of a flat web or sheet, those in which the mesh moves downwardly or upwardly during its production, and machines in which the mesh is produced in the form of a sleeve moving in a spiral path as successive links are added to it, that form of machine which is now thought most suitable for utilizing the principles above briefly set forth is one in which the mesh is made in the form of a flat sheet which hangs vertically and is given a movement transversely with regard to the forming tools during the addition of successive rows and a movement in the direction of its length upon the completion of each row sufficient to permit of the addition of the next successive row. In its general mode of operation, the machine to be described resembles the one illustrated in Patent No.

1,078,317, issued Nov. 11, 1913, to Harry W. and Charles G. Smith, but differs therefrom in many respects, which will be made clear in the description to follow.

In this machine the mesh support is in the form of a roll having studs or pins extending from its surface and these pins are located so as to engage in the links of the piece of mesh. This roll is mounted on a carriage which reciprocates with a step by step motion with relation to the link forming tools which are mounted in a fixed location on the machine base. The tool assemblies include a device for drawing wire from a suitably mounted supply, a knife which severs lengths of this wire, a pin which moves so as to bend the severed link into the U-shaped form of a staple, a front former which advances this staple and inserts its legs through a pair of links at the edge of the piece of mesh, a rear former which cooperates with the front former at the end of its advance movement and bends the staple so as to close the latter and form a ring, and a center former which moves into the staple as the latter is being closed so as to insure that the rings so formed will have the proper shape. The movement of the carriage with the mesh supporting pin roll is so coordinated with the action of the tools that the latter operate during the periods of rest of the carriage. When a row has been completed the carriage is rotated by a step so as to position the mesh properly for the addition of another row. Also at the completion of a row the carriage is displaced by half the diameter of a link in the direction of the axis of the roll so that the staples which are to be inserted to form the rings of successive rows will pass through a pair of links of the row just formed. In addition to the parts above described as forming the tool assembly, there are other devices for incorporating the disc of solder. These include means for supporting a supply of the solder material which is preferably in the form of a strip of indefinite length, a feeding means for advancing this strip as may be required, a plunger which punches a disc of the desired dimensions from the strip, and another plunger which moves this disc within the center former so that when the latter advances into its position of cooperation with the rear former the disc is in such a position that it will be engaged by the ends of the legs of the staple when the latter is bent to form the ring. The action of those parts of the forming mechanism by which the disc of solder is cut out and properly positioned is so timed with the action of the other parts of the forming device so that a disc of solder material is inserted in each link and the actuation of the several parts of the forming device is automatic, as are also the various carriage movements. The latter moves, as has been stated, with a step-wise motion transversely of the tools and then when a row of links has been completed the pin roll carried by the support is slightly rotated, and is shifted in the direction of its length by an amount equivalent to one half the diameter of a link, and the devices for advancing the carriage are reversed so that the carriage now travels with the same step by step movement in the reverse direction, the cycle of operations being repeated at each end of the traverse.

It sometimes happens that due to imperfections in the wire or the solder material, or because of a failure of the link forming tools, a link may be improperly formed or may be omitted. In order that a new link may be added at this break in the mesh the machine is constructed so that it may be operated manually for the addition of these repair links, and for this purpose the carriage feed is arranged so that it may be readily reversed at any point in its travel and may then be moved forward or backward to the desired point. Also the forming tools may be driven by hand so that the repair link may be inserted and then the carriage may be moved to its previous location and the automatic production continued. There are incorporated in the machine various other features which will be made clear in the detailed description of the parts of which it is formed.

For a clearer understanding of the principles of the invention, a machine by which the method may be practiced has been illustrated in the form which is now considered preferable in the accompanying drawings, in which.

Figure 4:
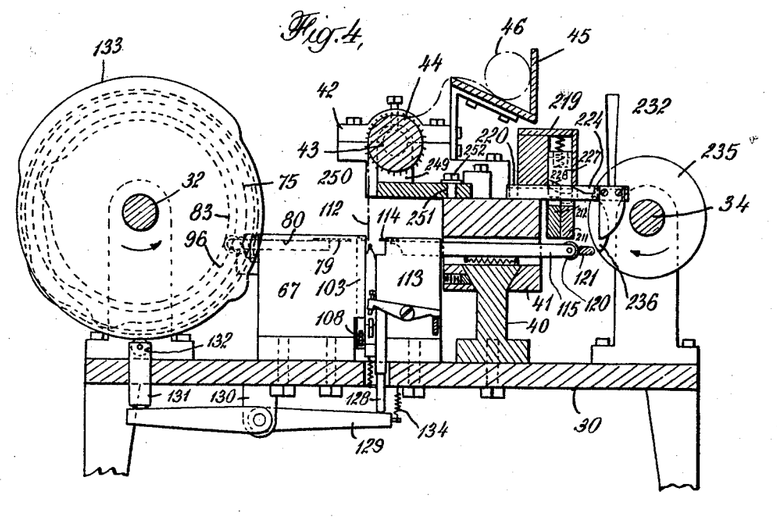
Fig. 4 is a vertical sectional view on the line 4—4 of Fig. 1.

Referring now to the drawings, the main bed or table 30 of the machine is seen to be provided with standards having bearings 31 in which are journaled four shafts 32, 33, 34 and 35. The shaft 32 carries fast and loose pulleys 36 and 37, the fast pulley having a handle 38 by means of which the shaft 32 may be operated by hand. The four shafts are geared together by beveled gears 39 so that they all rotate in unison. The bed 30 carries a slide 40 bolted in place. On this slide is mounted a carriage 41 which has brackets 42 for the shaft 43 of the work feeding pin roll 44. The latter may be formed as an integral portion of the shaft or else may be a sleeve which is secured rigidly thereto. This pin roll, as is shown in Fig. 4, has pins projecting from its outer surface which are spaced so as to engage the links of the fabric being formed. Supported above and somewhat to the rear of the pin roll is a box 45 in which the completed fabric may be disposed. The finished piece of mesh coming from the pin roll is usually rolled up as shown at 46 and during the operation of the machine the operator occasionally takes up the slack. Any other convenient means for supporting the completed work may be used instead of the box 45.

Figure 1:
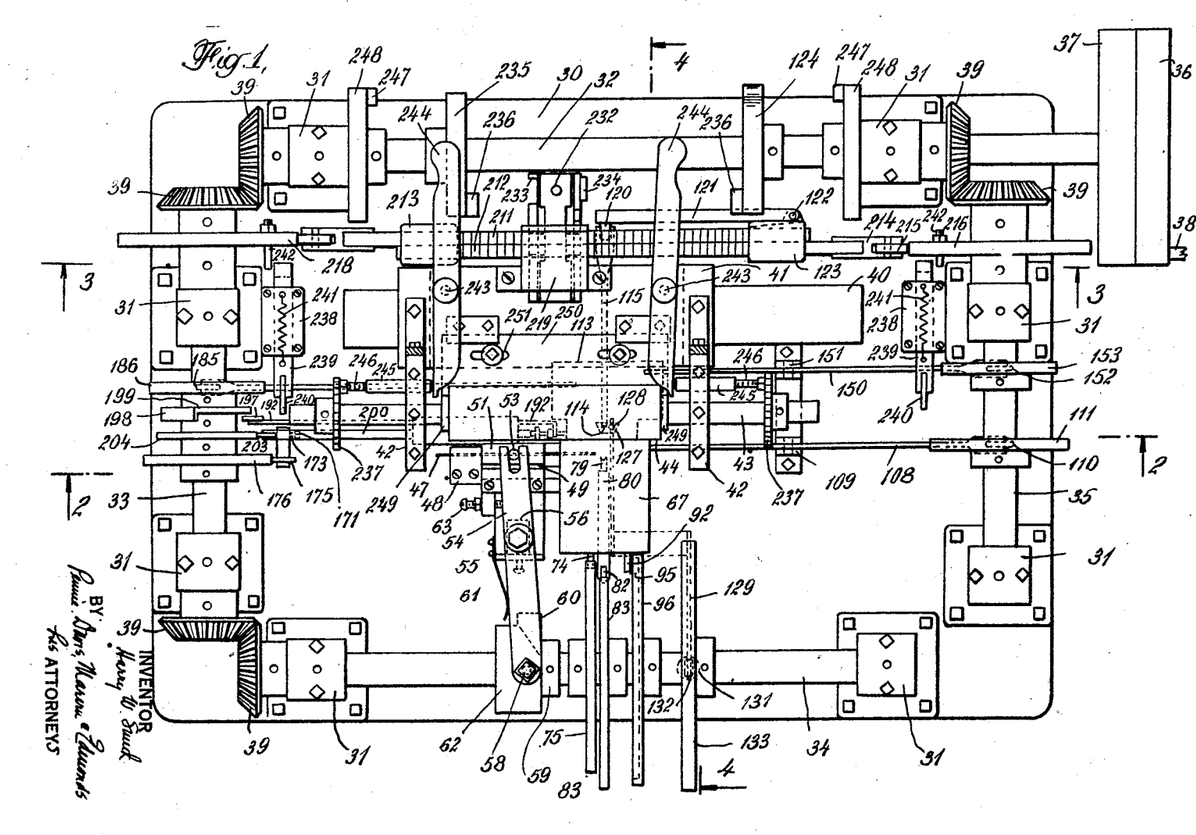
Fig. 1 is a top plan view of the machine of the present invention.
Figure 2:
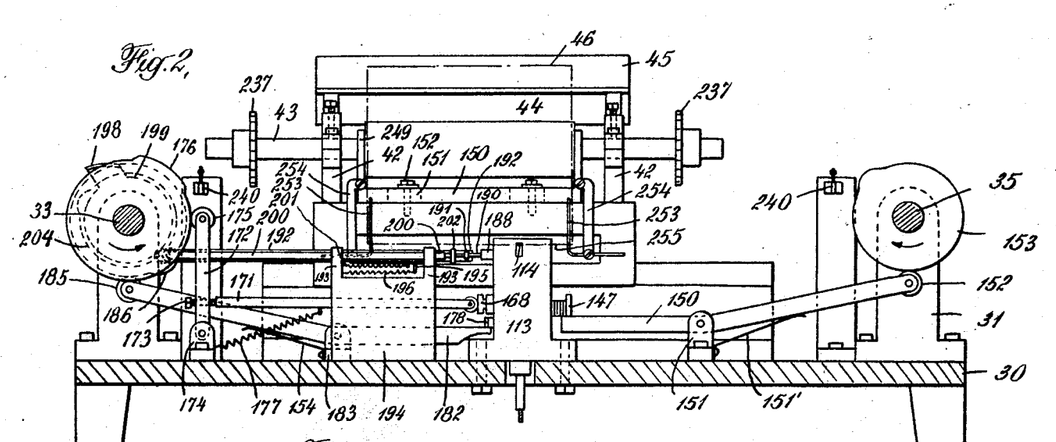
Fig. 2 is a vertical sectional view on the line 2—2 of Fig. 1.
Figure 5:
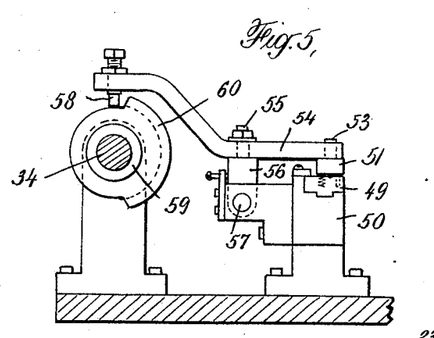
Fig. 5 is a vertical sectional view of a detail of the wire feeding mechanism.
Figure 6:
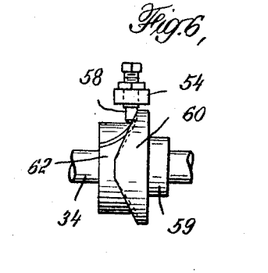
Fig. 6 is a face view of a portion of the wire feeding mechanism.
Figure 12:
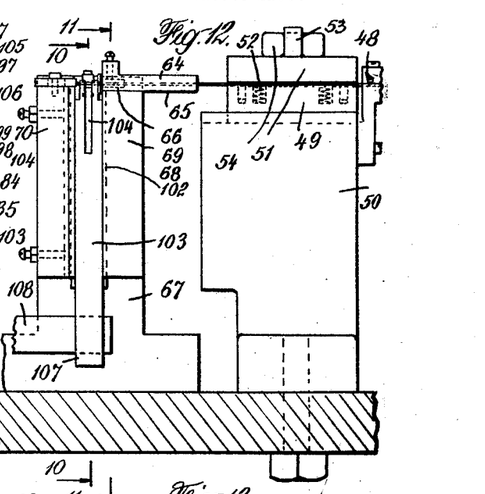
Fig. 12 is a face view of the front former assembly showing the face adjacent the rear former.
Figure 13:
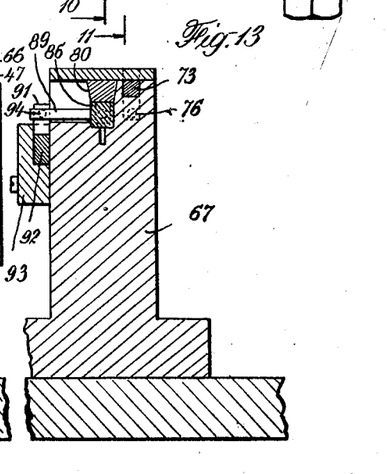
Fig. 13 is a cross sectional view of the front former assembly taken on the line 13—13 of Fig. 8.

The wire of which the links are made is illustrated at 47. A supply, such as a reel, of this wire is carried on the machine in a convenient location and from this source of supply the wire passes between the upper and lower plates of a friction block 48, thence passing to a feed device (Figs. 1, 5, and 12) which consists of a slide 49 mounted in suitable ways in a block 50. Mounted above and cooperating with this slide 49 is a presser block 51. The slide 49 has recesses in which are mounted coiled springs 52 against which the lower face of the presser block bears and these springs normally tend to keep the block and slide separated. The opposing faces of the presser block and the slide have grooves through which the wire may pass and the two parts are held against relative lateral movement by means of the pin and slot connections illustrated so that the grooves are always in proper relative position. The presser has extending from its upper surface a pin 53 which is engaged by the forked end of a lever 54 pivoted at 55 to the upper end of a rocking lever 56 which is pivotally mounted at 57 in an extension from the support 50. The rear end of the lever 54 carries a stud 58 which is acted on by cams mounted on the shaft 34, these cams being illustrated in Fig. 6. The hub 59, secured to the shaft 34, carries a cam 60 which is designed to operate from the side of the stud 58 and so oscillate the lever 54 on its pivot 55. A leaf spring 61 holds the lever 54 with its stud against the face of the cam 60. The hub 59 also has a peripheral cam 62 which acts upon the lower end of the stud so as to oscillate the lever 54 and the rocking lever 56 about the axis of the pivot 57. The two cams 60 and 62 are so designed that the lever 54 is given a four-way motion, or motion through a closed path. The first action is a rocking of this lever to cause the presser to clamp the wire in a groove between the presser and the slide. Thereafter the slide and presser are shifted laterally to feed the wire forward. The lever 54 is then rocked about the axis of the pivot 57 so as to permit the presser to loosen the grip on the wire and the lever with its associated parts is returned to its original position. An adjustable stop 63, located at one side of the lever 54, permits of regulation of the length of wire which will be fed at each operation of the feeding device.

From the feeding device the wire is led to the device by which it is severed, formed into staples and then these staples closed to form links. The length of wire passing beyond the presser and slide next passes through a groove formed between the opposed faces of plates 64 and 65, thence through a bushing 66. The plates referred to and the bushing are mounted in the side wall of a block 67 on which are mounted the front former, the cutting knife, and the parts associated therewith. The bushing is located at the rear end of the block, as seen in Figs. 8 to 13, and in the upper face of the block, near its rear end, is formed a slot 68, thus forming side walls 69 and 70. The wire fed through the bushing abuts against the face of a block 71, this block being adjustably mounted by screw and slot connections as shown. This wire is severed close to the face of the bushing by a knife 72 which is mounted on a slide 73 extending through a suitable slot in the block and terminating in a head 74 which is engaged by a cam 75 secured on the shaft 34. Mounted in a suitable recess 76 in the block 67 below the slide 73 is a coiled spring 77 which bears against the rear face of the head and tends to maintain the knife in its rearward position. It will be seen on reference to Fig. 9 that the knife has a blade which is somewhat offset from the end of the slide 73 and this blade normally lies close to the face of the bushing. As the wire is fed through the latter it moves forward until it strikes the face of the block 71 and remains there until it is severed by the knife and then the severed length formed into the staple, as will presently be described. The operation of the knife is properly coordinated for this purpose with the operation of the feeding mechanism.

In passing beyond the face of the bushing the end of the wire enters a pair of grooves formed across the faces of a slotted block 78. This block is rigidly mounted in the slot in the block 67 and projects upwardly therein. In grooves formed in the side walls of the slot in the block 78 extends the front former 79 which is mounted on a slide 80 being held adjustably in place on the upper surface thereof by a clamping block 81. The slide 80, which lies in a suitable recess in the block 67, extends beyond the rear end thereof and is provided at this end with a roller 82 which bears against the face of a cam 83 (Fig. 1) mounted on the shaft 34. Also mounted in the slot 68 in the block 67 is a lever 84 pivoted at 85 on a slide 86 which extends through a suitable recess in the block 67. At its rear end this slide is recessed and a coiled spring 87 enters the recess and bears at its other end against a lug 88, extending downwardly from the slide 80. The slide 86 carries a pin 89 which extends through an aperture in the side wall of the block 67 and there lies between a pair of lugs 90 and 91 mounted on a slide 92 which lies in a recess formed in a block 93 bolted to the outer side wall of the block 67. Mounted in the lugs 90 and 91 are adjustable stops 94, 94, which bear against the opposite sides of the pin 89. The slide 92 carries a roller 95 which enters a channel formed in the side face of a cam 96 mounted on the shaft 34. As the cam 96 revolves it acts through the connections described to cause the slide 86 to reciprocate in the block 67. The lever 84 which is pivotally secured to the front end of the slide 86 carries at its end an upstanding pin 97 which lies in registry with the slot in the block 78, and may be swung into this slot as the slide reciprocates. Also the lever 84 has a slot 98 through which passes a pin 99 mounted across the slot in the block 78. The slot is given a suitable inclination so that as the slide 86 reciprocates the pin will be moved up to operating position for a purpose presently to be explained and then will have a rectilinear movement with the slide in such operating position.

Figure 10:
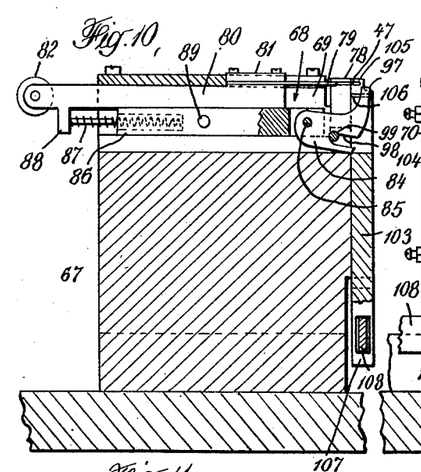
Fig. 10 is a vertical cross-sectional view of the front former assembly, taken on the line 10—10 of Fig. 12.
Figure 11:
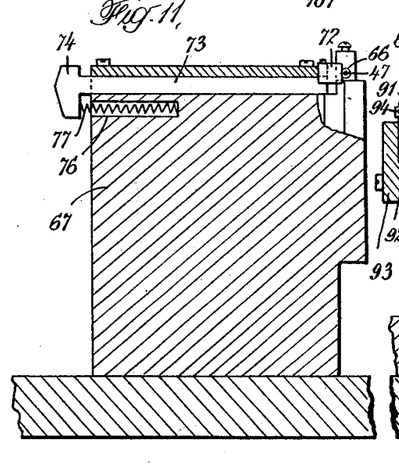
Fig. 11 is a cross-sectional view on the line 11—11 of Fig. 12.
Figure 21:
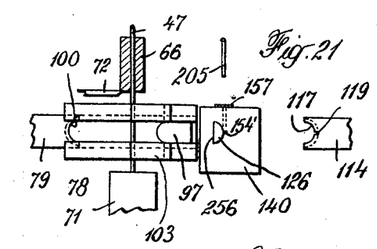
Fig. 21 is a plan view of the link forming tools showing their relative locations of rest.
Figures 22, 23:
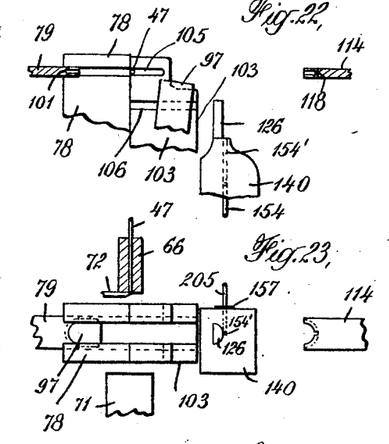
Fig. 22 is a transverse section of the parts illustrated in Fig. 21.
Fig. 23 is a view similar to Fig. 21, but showing the relative location of the parts when a piece of wire has been severed and bent into the staple form.
Figure 24:
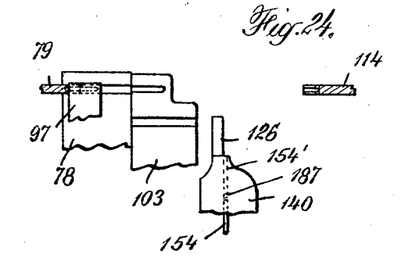
Fig. 24 is a view similar to Fig. 22, but showing the parts in the positions illustrated in Fig. 23.

The pin 97 is the bending pin which acts on the severed length of wire to give it the staple form. When the pin is in its position of rest the slide 86 is as shown in Fig. 10, and the pin lies down below the wire which lies in the grooves in the rear face of the block 78. When the slide is moved forwardly by the action of the cam 96 the lever 84 is raised by the co-action of the pin 99 and slot 98 and the bending pin 97 strikes against the wire which has just been severed and bends it into a U-shape, thus forming a staple. The legs of the staple enter the grooves in the side walls of the block 78 and the rear end of the staple is finally brought to rest against the end of the former 79. The latter, as is illustrated in Fig. 21, has a recessed front end as at 100, and there is a channel 101 formed in the recessed front wall into which the wire is forced by the action of the pin 97.

Mounted in a dove-tailed channel 102, formed in the rear face of the block 67, is a vertical slide 103. The upper end of this slide is slotted as at 104, the slot being in registry with the slot in the block 78. Both side walls of the block are provided with apertures 105 which normally lie in registry with the ends of the grooves which extend along the side walls of the block 78, and these apertures remain in registry with the grooves until the wire has been forced into the latter by the action of the forming pin. Also in the opposite side walls of the slot in the slide 103 are grooves 106 which extend from one edge of the slide to the other. The slot formed in the slide is of such dimensions that the forming pin may move freely in it even when the slide is in its extreme upper position. At the lower end the slide is provided with a pair of straps 107 into which projects the end of a lever 108. This lever is pivoted in a suitable bracket at 109 and terminates at its other end in a roller 110 which bears against the surface of a cam 111, mounted on the shaft 35.

When the length of wire has been fed through the bushing 66 into the slot in the block 67 the knife is actuated to sever the wire and thereafter the bending pin forces the wire into the grooves in the block 78 so as to produce a staple. The bowed end of this staple is eventually forced against the end of the front former which is in retracted position. The bending pin now moves down to inoperative position below the plane of the grooves in the block 78 and thereafter the vertical slide 103 moves up so that the grooves 106 are in registry with the grooves in the block 78. The former now starts forward and pushes the staple before it through the grooves in the block 78 and into the grooves 106 in the slide 103. The slide accordingly operates to provide a guide for this staple the legs of which are now to be inserted through a pair of adjacent links of the mesh. The mesh fabric which hangs downwardly from the surface of the pin roll as a flat web or sheet will be seen, from Fig. 4, to lie quite close to the face of the block 67 and as each link is formed the carriage on which the pin roll is supported is given a movement relative to the forming tools so as to advance the sheet of mesh by an amount equivalent to the diameter of a single link. Accordingly, when the front former advances the mesh will be properly positioned so that the legs of the staple will pass through a pair of links at the edge of the mesh, and the staple may now be closed to form a ring. In this closing there is employed a rear former which serves to bend the ends of the staple legs so as to abut each other and complete the ring, and a center former which passes into the interior of the ring thus formed and serves to assist in the bending operation.

The rear former and its associated mechanism shown in Figs. 8, 9, 14 and 15 are mounted in a block 113, bolted to the table of the machine and located face to face with the block 67. The former proper 114 is carried on the upper end of a slide 115 which lies in a channel in the upper surface of the block, being held there by a face plate 116, bolted to the upper surface of the block to close this channel. This former has a recess 117 formed in its forward end and the recess has a channel 118 similar to the channel 101 in the front former. Also at the bottom of the recess is formed a notch 119 into which is to be introduced, as will later be described, the piece of solder which is to be gripped between the ends of the piece of wire when the link is closed. This slide 115, (Fig. 4) extends through a slot in the slide 41 and carries a roller 120 at its rear end. This roller (Fig. 1) bears against the end of an arm 121, pivoted at 122 to a block 123 mounted on the base of the machine. A cam 124 mounted on the shaft 32 carries a projection which strikes the side of the arm 121 and causes it to swing on its pivot and move the rear former slide forwardly, thus advancing it toward the front former. It will be seen on reference to Figs. 21 to 27, inclusive, that as the front former moves to the rear the staple formed in the manner described will be carried to the rear and the legs of this staple passed through the adjacent links 125 at the lower edge of the mesh. The rear former 114 moves forward to cooperate with the front former so that as the latter continues its advance the ends of the staple having passed through these links will enter the channel 118 and there be bent inwardly so as to close the ring. However, as this action is carried on there is moved upwardly into operative position a center former 126 which is in the form of a half-round bar. This center former is properly proportioned so that it may enter the recess 117 and thus serve to close the channel 118. Also the flat front side of this center former serves as an abutment for the adjacent links 125 during the time when the formers are moving together so as to close the link.

Figures 14, 15, 16, 17, 18, 19, 20:
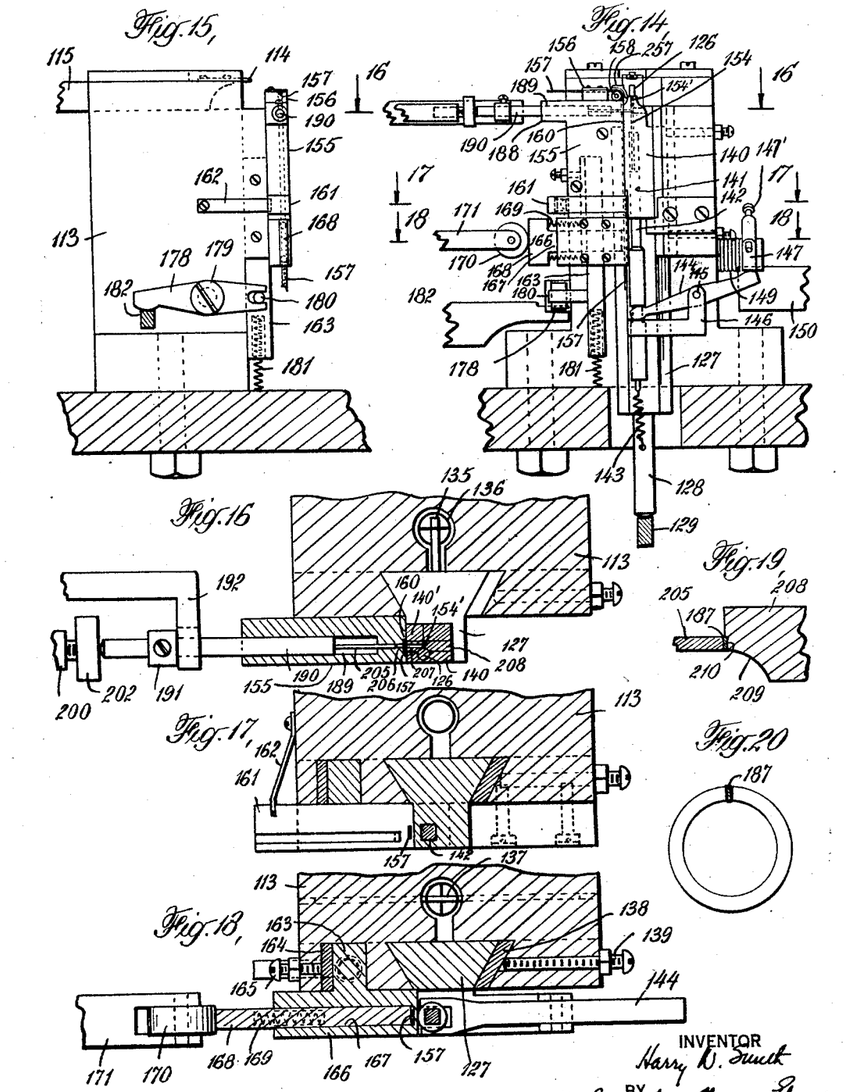
Fig. 14 is a face view of the rear former assembly.
Fig. 15 is a side elevation of the rear former assembly.
Figs. 16, 17, and 18 are transverse sectional views on the lines 16—16, 17—17, and 18—18 respectively of Fig. 14.
Fig. 19 is a sectional view of a detail of the solder cutting mechanism.
Fig. 20 is an enlarged view of a link showing the piece of solder in place between its ends.

The center former is mounted on the upper end of a slide 127 which is formed to enter a dove-tailed slot in the front face of the block 113. At its lower end the slide 127 terminates in a pin 128 which rides on the upper surface of a lever 129 pivotally mounted in a bracket 130 on the lower surface of the table. The lever 129 is offset and at its rearward end extends beneath a pin 131 mounted in an aperture through the table. This pin carries a roller 132 at its upper end which, in turn, bears against a cam 133 secured to the shaft 34. The other end of the arm 129 is held in its uppermost position against the pin 128 by a spring 134. The slide 127, as is shown in Fig. 16, is provided with a pin 135 which enters a suitable recess through the block 113. At the end of this pin is secured a coiled spring 136 anchored at its lower end to a pin 137 which lies in a groove extending across the lower surface of the block 113. This spring acts to hold the slide in its lowermost position from which it is moved upwardly by the action of the arm 129 as described. The slide is held in position within the dove-tailed channel by means of blocks 138 which are adjustably secured in place by means of screws 139.

Mounted near the upper end of the slide is a block 140 which at its upper end carries the center forming pin 126, and also a block 140' (Fig. 16). This block is vertically grooved and cooperates with the upper portion of the block 140 which has a similar groove in which the pin 126 is secured by suitable screws. This block has a passageway 141 extending through it vertically and entering this passageway is a plunger 142 which is somewhat enlarged at its lower end and is connected by means of a spring 143 to the pin 128. This spring 143 normally holds the plunger in its lower position. The plunger has a circumferential channel in the enlarged portion in which lie the forked ends of an arm 144 pivotally mounted at 145 in the smaller leg of an L-shaped bracket 146 which is secured to the slide 127 and has a passageway in it through which the lower end of the plunger may move. The arm 144 is rocked on its pivot by means of a lever 147 which carries an adjustable pin 147' at its end so that the throw of the arm 144 may be regulated. This lever 147 is mounted on a stud 148 which extends from the face of the block 113. Around the shaft of this stud is a coiled spring 149 which normally tends to rock the lever so that it is clear of the arm 144. At its rear end the lever 147 bears against the end of an arm 150 which is pivotally mounted on a suitable support 151 on the bed of the machine. The end of this arm carries a roller 152 which bears against the surface of the cam 153 on the shaft 35. The roller is held against the face of its cam by means of a leaf spring 151' attached to the support 151 and bearing against the under surface of the lever.

The upper end of the plunger 142 carries a fine rod 154 which extends through a passage 154' in the block 140, this passage lying to the rear of the pin 126. As will presently be described, the piece of solder which is to be placed between the ends of the wire of each link is deposited in this passageway and when the center former has moved up into position so as to assist in closing the staple, at the proper instant the plunger 142 is raised so that the rod 154 will carry the piece of solder out and place it in the notch 119 in the bottom of the recess in the rear former, where it is held until it is gripped by the ends of the wire.

The mechanism by which the piece of solder referred to is punched from the source of supply and deposited in the passage in the block 140 is as follows. Secured to the base of the block 113 adjacent the block 140, is another block 155 which carries at its upper end a guide block 156 through which a strip of solder 157 passes from a source of supply not shown. This strip of solder passes over a roller 158 mounted on a stud secured in the side wall of an extension 159 of the block 155. The strip of solder then passes down in a channel 160 formed in the side face of the block 155 between that block and the block 140. The block 155 carries a slide 161 near its lower end. This slide has an aperture near its forward end through which the strip of solder 157 passes (Fig. 17) and at its rear end a leaf spring 162, secured to the side of the block 113, forces this slide inwardly. The passageway in the slide through which the strip of solder passes is a comparatively close fit and the spring-pushed slide serves to exert a slight friction on the strip so that it will remain taut.

Mounted on a slide 163 which runs in a suitable vertical channel in the face of the block 113 is a gripping device which serves to draw the strip of solder from the source of supply. This slide, which is held in place within its channel by a spacing block 164 secured in place by adjustment screws 165, has a portion 166 which extends beyond the face of the block 163 below the end of the block 155. Through this portion is a passageway through which the lower end of the strip 157 extends and a plunger 167 runs in a suitable passageway through the portion 166. This plunger has a T-shaped head 168 against which bear compression springs 169. The other ends of these springs enter recesses in the portion 166. Against the head 168 bears a roller 170 carried on the end of an arm 171 contacting with an adjustment screw 173 carried in an upstanding arm 172. The arm 172 is pivotally mounted in a bracket 174 extending upwardly from the base and at its upper end the arm 172 carries a roller 175 which bears against the face of a cam 176 mounted on the shaft 33. A spring 177 secured at one end to the rod 171 and at the other to the bracket 174, serves to hold the roller 175 against the face of this cam. It will be seen that as the cam 176 revolves it causes the arm 171 to reciprocate and thus reciprocates the slide 167 in the extending portion 166 of the slide 163. In its inward movement the plunger 167 grips the strip of solder 157 and at its outward movement the strip is released. During this gripping, however, the slide 163 is moved downwardly and accordingly the strip of solder is drawn with the slide. This downward movement of the slide 163 is brought about by means of a lever 178 (Fig. 15) pivoted at 179 to the face of the block 113. The forward end of this arm is forked and engages a pin 180 extending from the side of the slide 163. The latter is socketed at its lower end and in this socket is a spring 181 which bears at its lower end against the bed of the machine. The rear end of the arm 178 bears against the end of an arm 182 pivotally mounted on a bracket 183 extending upwardly from the base. A leaf spring 184, secured to this bracket, bears against the upper side of the arm and at its rear end the arm carries a roller 185 which bears against the surface of the cam 186 secured on the shaft 33. As the shaft rotates the arm 182 is rocked at the proper time, thus moving the slide 163 up and down. The action of the gripping plunger 167 is properly coordinated with the movement of this slide so that the strip of solder is gripped during the downward movement and the plunger is released when the slide is restored so that the solder may be engaged at a new point.

As the solder is drawn from the source of supply over the roll 158 discs are punched from it by mechanism now to be described, and these discs are then deposited in the passageway in the block 140 so that they may be raised by the plunger rod 154. It will be seen on reference to Fig. 20 that the disc 187 has substantially the same cross-sectional area as the wire of which the links are made, and the disc is preferably slightly concave on its opposed faces so that the ends of the wire may engage it and hold it tightly.

The strip led from the source of supply passes over the roll 158 down through a channel in the face of the block 155, as has been described. At its upper end the block 155 is provided with an extension 188 in which is formed a passage 189. In this passage is mounted a plunger 190 which carries at its rear end a collar 191. The plunger is engaged at a point in advance of this collar by the forked end of a lever 192 which is carried in spaced arms 193 extending upwardly from the top of a block 194 rigidly secured to the base. The lever 192 is provided with a pin 195 to which is attached the end of a coiled spring 196, the other end of this spring being secured to one of the arms 193. The rear end of the lever 192 carries a roller 197 which is engaged by a flange 198 on a cam 199 mounted on the shaft 33. This cam is so arranged that as it rotates the flange engages behind the roller 197 and moves the lever 192 toward the shaft 33, thus pulling the plunger 190 outwardly in the passage 189. The lever is restored to its position of rest by the spring 196 as soon as the roll is disengaged from the cam. The plunger 190 is moved forwardly in the passage by means of a lever 200, also movably mounted in the spaced arms 193 and provided with a spring 201 similar in its action to the spring 196. The forward end of the lever carries a head 202, adjustably secured in position by its threaded mounting, and this head bears against the rear end of the plunger. The rear end of the lever 200 carries a roller 203 which bears against the surface of a cam 204 mounted on the shaft 33. As this cam rotates it reciprocates the lever 200 so as to force the plunger 190 into the passage, and this plunger is then positively moved outwardly from the base by the forked arm 192.

The inner end of the plunger 190 carries a fine rod 205 which serves as a punch. This rod moves in a small passageway 206 which connects with the main passage 189 and this passage is so located as to open into the channel in the face of the block 155 through which the strip of solder 157 is drawn. The block 140' and the block 140 are drilled so as to form a recess which extends through the blocks to a point opposite the end of the channel 206 and in this bore is mounted a bushing 207 which lies in the block 140', and a die 208 which lies in the bore in the block 140. This die has a rounded portion 209 so as to fit around the pin 126 and it has a shallow recess 210 which lies opposite the passage through the bushing. This die which holds the bushing in place is, in turn, held in place in the block in any convenient manner, or, if desired, may be made integral with the block. The passage 154' which is formed in the block 140, as has previously been described, is located to the rear of the pin 126 and is also in registry with the end of the passage through the bushing 207. The operation of the parts described is as follows. The strip of solder drawn by the feeding devices described over the roll 158 passes down in front of the passage 206 at the time the plunger 190 with its punch 205 is in the retracted position, but as soon as a new portion of the solder has been placed in position the lever 200 advances the plunger and forces the punch 205 through the piece of solder so that the cut-out portion 187 is advanced through the passage in the bushing into the socket 210. The socket and the end of the punch are slightly convex so as to indent both faces of the disc. This socket is opened from beneath to the passage 154' in which the rod 154 on the plunger 142 moves. The plunger 190 is now retracted, leaving the disc of solder in the socket. During this action the forming devices have been operating and at the proper instant the slide 127 is raised so that the center former is brought into its position of cooperation with the rear former. The plunger 142 also moves upwardly relatively to the slide so that the rod 154 will advance the disc 187. Eventually, when the two formers are in the proper relative positions, the disc is forced into the notch 119 in the rear former and then as the staple is closed the ends of the wire are forced against the disc so as to clinch it. The slide 127 is then lowered, carrying the center former out of action, the plunger 142 being moved relatively to the slide in this downward movement. Thereafter the strip of solder is advanced by the necessary distance, a new disc punched out of it, moved into position so as to be engaged by the rod 154, and then the cycle of operations by which the disc is inserted in the link is repeated.

The shaft 43 on which the pin roll is mounted has previously been described as movable along the slide 40. This carriage is reciprocated along the slide with a step by step movement, advancing at each step by a distance equal to the diameter of a single link. To give the carriage this movement there are provided two racks 211, 212, located side by side in passageways through a bracket 123 and a similar bracket 213 mounted rigidly on the bed of the machine. These racks are driven by similar mechanism which will be described only in connection with one of them. The rack 212 has a portion extending to the right in Fig. 1, and carries at its end a forked head 214, in which is mounted a roller 215 which bears against a cam 216 on the shaft 35. As this cam 216 rotates the rack is reciprocated back and forth in a direction parallel to the axis of the pin roll. The rack is held with its roller against the face of the cam by means of a spring 217 connected at one end to a pin on the under side of the rack and at the other to a pin on the bracket 123. The rack 211 is similarly driven from a cam 218 on the shaft 33. On the upper surface these racks are provided with teeth which slope in opposite directions, and it will be seen that as the shafts rotate both racks reciprocate, their movements away from the shaft occurring at the same instant. One of these racks, however, remains inoperative during the movement of the slide in one direction, and at the end of this movement a device is automatically actuated which brings the other rack into operation, thereby reversing the direction of travel of the carriage.

Figure 3:
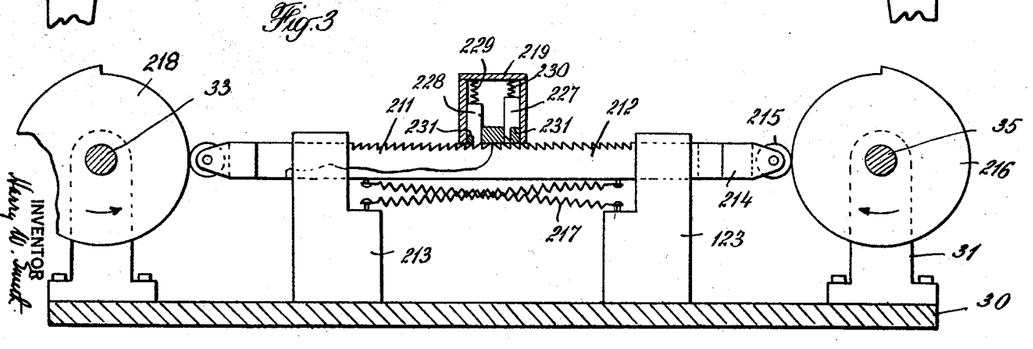
Fig. 3 is a vertical sectional view on the line 3—3 of Fig. 1.
Figure 7:
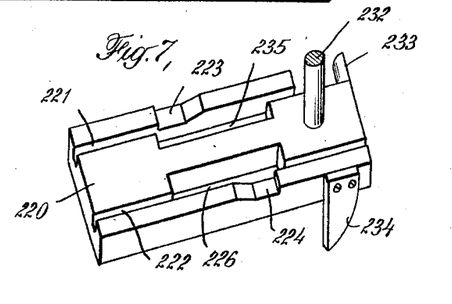
Fig. 7 is a view in perspective of the slide for reversing the action of the pawls of the carriage feed.
Figure 8:
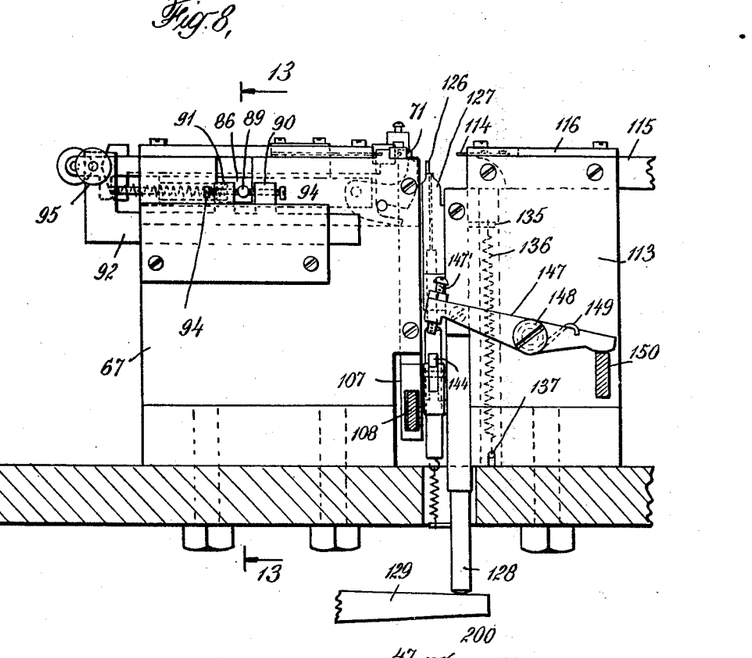
Fig. 8 is a side view of the forming tool assembly.
Figure 9:
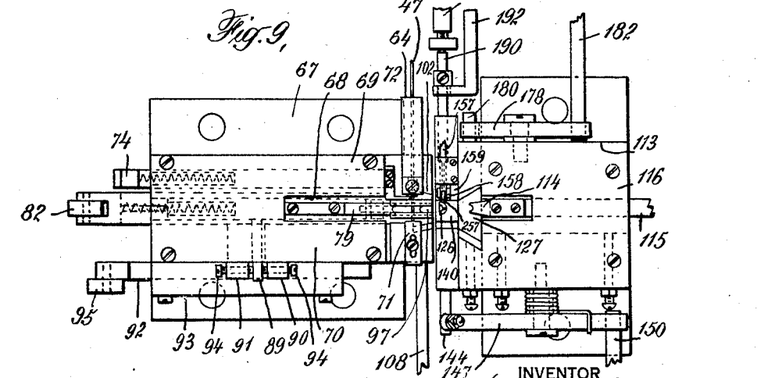
Fig. 9 is a top view of the parts illustrated in Fig. 8.

The mechanism by which the racks are connected to the carriage consists of a housing 219, secured to the upper surface of the carriage along its rear edge. Mounted in this housing is a slide 220, shown in Fig. 7. The upper surface of the slide has two parallel channels 221 and 222 formed in it, and the outer side walls of these channels are formed with depressions 223 and 224. Also the bottom of each channel is apertured adjacent the depression as at 225 and 226. Within the housing are dogs 227 and 228 which are held against the upper surface of the slide by springs 229 and 230. These dogs have shoulders 231 resting on the upper surfaces of the side walls of the slide and when either dog is clear of the depression in the side wall on which it rests it will be raised so that its lower end will be clear of the aperture and in the position occupied by the dog 227 in Fig. 3. The position of the slide accordingly determines which of the dogs shall be operative to engage the teeth of the racks and as shown in Fig. 3, the dog 228 is in this operative position and therefore as the rack 211 is reciprocated its teeth will strike the dog and thus move the carriage. When the end of the traverse of the carriage has been reached the slide may be moved inwardly manually by means of the handle 232, thus reversing the action of the dogs and causing the other rack to become operative to move the carriage in its return movement. However, it is preferable that this reversing of the direction of travel of the carriage should be performed automatically and for this purpose the slide is provided with lugs 233 and 234, near its rear end. The shaft 32 is provided with cams 235 and 124 previously referred to, each of which cams carries a projection 236 on its flat surface. As the carriage is moved in one direction or the other eventually the slide will be placed so that the lugs 233, 234 will be engaged by one of these projections 236 or the other, and the rotation of the shaft will accordingly cause the slide to be moved inwardly or outwardly with the result that the action of the dogs is reversed.

At the end of the traverse of the carriage in one direction; that is, upon the completion of a row of mesh across the web, it is necessary that the pin roll should be rotated so that the mesh is moved longitudinally by one row so that a new row may be added at the edge of the piece of mesh. For this purpose the shaft 43 carries ratchet wheels 237 at either end. Mounted in suitable brackets 238 near either end of the bed are sliding levers 239 which carry pawls 240 in their forward ends. These levers are held in their retracted position in the brackets by means of springs 241 attached at one end to the bracket and at the other end to the lever. The rear ends of these levers are beveled, as is indicated by the dotted lines, and in their rearward position these beveled portions lie in the path of travel of studs 242, extending from the side of the cam discs 216 and 218. As the cams revolve the studs strike the beveled portions of the levers and move the levers forward and this movement accordingly takes place upon each revolution of the shafts 33 and 35. Under ordinary conditions the pawls 240 perform no function but when the carriage has moved to the extreme end of its travel one or the other of the ratchet wheels 237 will be engaged by the appropriate pawl 240 and the parts are so constructed that the advancing movement of the slide 239 will cause the ratchet wheel, and accordingly the shaft 43, to be rotated by a distance equivalent to the diameter of a link. The rotation takes place in the direction which causes the mesh to be moved upwardly and thus at the completion of a row of links the pin roll is moved so that the mesh will be positioned properly to receive a new row.

As has previously been explained, the mesh fabric which is made on this machine is in the flat form, and as each link is inserted at the edge of the mesh it is engaged with two links of the row just above. Each row across the mesh contains the same number of links but as the links of successive rows are necessarily offset by reason of their engagement with the links of the preceding row, it follows that the centers of the links of one row are spaced equidistant from the centers of the links of the rows above and below. Consequently, at the completion of each row of the mesh it is necessary that the pin roll not only be rotated by an amount equal to the diameter of a single link, but this roll must also be shifted in the direction of its axis by an amount equal to one half the diameter of a link. This longitudinal shift is brought about as follows: Near each end of the carriage is pivoted on a stud 243 a lever 244. The front end of this lever bears against a rod 245 mounted slidably in an aperture in the bracket 42. This rod has an adjustment screw 246 at its other end, the head of which bears against the ratchet 237. The rear end of the rods 244 are so located that they may be struck by cam lugs 247 on cam discs 248 and 124 on the shaft 32, and accordingly when the carriage is moved to one end or the other of its path of travel the rotation of the cams 248 and 124 causes the lugs to strike the end of one lever, swing it on its pivot, and thus move the rod 245. This movement of the rod 245 causes the ratchet 237 and the shaft 43 on which it is mounted to be moved axially a slight distance, the extent of which may be regulated by the proper adjustment of the screw 246. The shaft 43, as has previously been explained, is supported in brackets 42 but is movable lengthwise in these brackets. The pin roll secured to the shaft, however, lies between brackets 249 which extend upwardly from a plate 250 formed with slots 251 through which extend studs 252 screwed into the upper surface of the carriage. As the levers 244 are swung on their pivots the movement of the rod 245 caused thereby will in turn produce a movement of the shaft 43 and since the pin roll lies between the brackets 249 this movement of the pin roll will cause the plate 250 to move relatively to the carriage and this movement is permitted by the stud and slot connections above described.

It will be seen on reference to Fig. 4 that the piece of mesh 112 hangs down vertically from the face of the pin roll and its lower edge lies near the front former block and close to the surface thereof. This flat sheet of mesh is stretched taut over the pin roll by reason of the pins but when it hangs clear there is a tendency for the links of the longitudinal edges of the piece to swing to one side or the other and this would prevent the insertion of additional rings through them. Accordingly there are provided supports for the edges of the mesh below the pin roll which may take various forms but are here illustrated as wires 253 carried in brackets 254. These wires are L-shaped in form and have vertical portions which extend upwardly a considerable distance above the lower edge of the mesh represented by the dotted line 255. The vertical portions of the wire are in such position that they will lie within the links of alternate rows, the links being formed around these wires by the forming tools. When the links are released by the forming tools they are held in the proper position by these wires and eventually as the mesh is moved upwardly by the action of the pin roll the links so formed about the wires will slip off. These wires accordingly hold the sheet of mesh taut during its formation.

Figure 25:
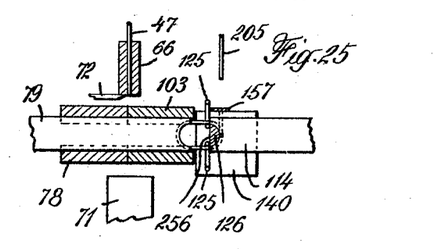
Fig. 25 is a horizontal section of the parts illustrated in Fig. 21, showing the legs of the staple inserted through a pair of links of the mesh with the rear and center formers moved to operative position.
Figure 26:
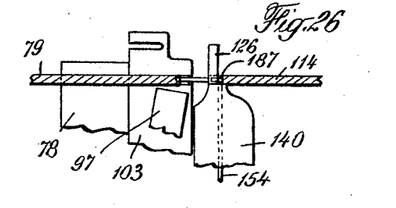
Fig. 26 is a transverse vertical section of the parts in the positions shown in Fig. 25.
Figure 27:
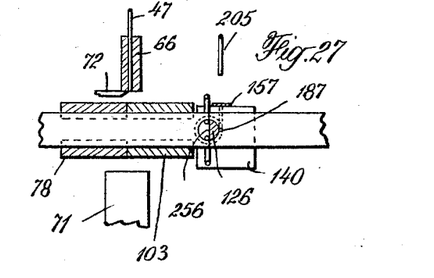
Fig. 27 is a view similar to Fig. 25 but showing the parts in the positions which they assume when the link is completed.

In addition to the means for holding the piece of mesh taut, just described, it is desirable that the two links through which the legs of the staple are to be inserted should also be held against movement, at the time of this insertion. For this purpose the end of the center forming pin 126 has been given a flat surface 256 (Fig. 25). This surface serves as an abutment for the links 125 through which the legs of the staple are to pass. As will be seen in the figure referred to, these links lie against the flat surface when the center former is in position to cooperate with the rear former and are thereby prevented from being displaced so that the staple would not properly engage with them.

It will be understood that the links of successive rows across the mesh lie in reverse positions of inclination. The links naturally assume the proper position under the influence of gravity when they are released from the forming tools but sometimes a link will be held by the links through which it is engaged and will not fall freely to the proper position. In order, therefore, to insure that each link will incline in the right direction there is provided a bar 257 which is secured on the upper end of the slide 140 at a point near the center former 126. This bar is properly located so that as each link is released by the front and rear formers it will be engaged by the bar and prevented from tilting in the wrong direction. As the slide is retracted the bar moves down with it and the link may then hang freely.

The machine here illustrated operates automatically and the parts are so coordinated that the wire is fed, severed, formed into staples, and these staples inserted through the links at the edge of the piece of mesh and then closed. During this insertion of each link the carriage is at rest but when the forming tools are retracted the carriage advances another step and the cycle of operations is repeated until a row has been finished. Thereupon the direction of the carriage movement is reversed and the pin roll is shifted longitudinally in the carriage by the desired amount. During the formation of the link the piece of solder is cut from the strip and moved into such position that as the staple is closed this piece of solder will lie between the ends of the staple so as to be gripped thereby. If, through a defect in the wire or solder, or by any failure of the mechanism, a link should be inserted in the mesh without the solder in place, or if no link should be formed at any particular point, the operator may stop the machine and move the carriage back to the desired point and cause the forming tools to operate so as to insert the link at the proper point. The machine is capable of making mesh of various widths, the determination of the width of the web depending on the point at which the carriage feed is reversed. This can be adjusted by the proper disposition of the cams 124 and 235 on the shaft 32 and also by adjustment of the cams 248 and of the rods 245.

While the forming assemblies and the devices by which the disc of solder is incorporated in each link have been illustrated in connection with the machine which produces mesh in the flat form, it will be seen that this mechanism either in its present form or with such changes in detail as might be necessary, could also be incorporated in a machine designed to produce sleeve mesh. Also the principles of this invention may be incorporated in the machine for producing mesh a row at a time instead of a link at a time. As has previously been explained in that type of machine the wire is previously formed into staples which are fed to the forming tools which perform the function of inserting the legs of the staples through the links at the edge of the mesh and closing the staples to form links. In either case, however, the principles of operation are the same; that is, as each staple is inserted through the links a disc of solder will be brought into proper position so that as the staple is closed its ends will grip the solder disc and maintain it in this position until the mesh is given the heat treatment.

The final step in the production of closed mesh by the method herein described is the step of closing the links by melting the solder disc gripped between the ends of each link so as to cause this disc to soften and unite these ends. For this purpose the mesh is subjected to heat treatment in a furnace. Whenever a sufficient quantity of mesh has been produced the machine will be stopped and the piece of mesh removed from it. This mesh is then placed in a furnace which is maintained at a temperature sufficient to melt the solder. The mesh is heated until the solder has softened to the desired extent and then the temperature is lowered so as to permit the solder to solidify. The mesh is now finished and is removed and made use of in such ways as may be desired.

It will be seen, therefore that the present invention provides a method for producing mesh, the rings of which are continuous, without employing wire which has solder incorporated in it. The mesh has an appearance which does not differ from that of mesh made of solder core wire and it also has the strength of solder core mesh which has been given heat treatment. It, therefore, possesses the several advantages of this type of mesh but the materials of which it is made are considerably cheaper, while the rate of production is substantially the same.

I claim:

1. In a machine for making link mesh, the combination of a support for a piece of mesh, link forming devices, power driven mechanism for giving the devices and the mesh a step by step relative movement and for operating the devices in each period of rest of the movement to form links, a supply of solder, and means for punching discs therefrom and inserting a disc between the ends of each link as it is formed.

2. In a machine for making link mesh, the combination of a support for a pice of mesh, forming tools, a supply of wire link material, means for feeding this material to the tools, means for giving the tools and the piece of mesh a step by step relative movement and for operating the tools in each period of rest of this movement, a supply of strip solder, and means for punching discs from the strip of solder and inserting a disc between the ends of each link as it is formed by the tools.

3. In a machine for making link mesh, the combination of a support for a piece of mesh, link forming devices, a supply of wire link material, means for feeding this material to the link forming devices, a supply of solder, means for punching discs from this solder and inserting these discs in the link forming devices, and power driven mechanism for giving the devices and the piece of mesh a step by step relative movement and for operating the devices in each period of rest of this movement to form links, each of which has a piece of solder between its ends, and to intermesh each of the links so formed with a plurality of the links of the mesh.

4. In a machine for making link mesh, the combination of a support for a piece of mesh, link forming devices, means for feeding wire and solder thereto, a cutter for the wire, means for punching discs of the solder, and means for moving the piece of mesh and the link forming devices relatively with a step by step movement and for operating the devices in each period of rest of this movement to form links of the pieces of wire, to insert a disc of solder between the ends of each link, and to intermesh each of these links with a plurality of links of said mesh.

5. In a machine for making link mesh, the combination of a support for a piece of mesh, link forming tools, a supply of wire link material, means for feeding this material to the tools, power driven mechanism for giving the tools and the piece of mesh a step by step relative movement in a direction transversely of the piece of mesh and for operating the tools in each period of rest of this movement, a supply of solder, and means for punching discs therefrom and inserting a disc between the ends of each link as it is formed by the tools.

6. In a machine for making link mesh, the combination of a support for a piece of mesh, link forming tools, means for operating these tools to form links and to intermesh these links with a plurality of links at the edge of the mesh, means for feeding solder and for punching discs therefrom, means for inserting a disc of solder between the ends of each link as the latter is being closed by the tools, means for giving the tools and the piece of mesh relative movement in a direction transversely of the piece of mesh to present different portions thereof to said tools to receive links, and means for reversing the direction of such movement.

7. In a machine for making link mesh, the combination of a support for a piece of mesh link forming tools, means for operating said tools to form links and to intermesh these links with a plurality of links at the edge of the piece of mesh, means for feeding solder and for punching discs therefrom, means for inserting a disc of solder between the ends of each link as the latter is being closed by the tools, means for giving the tools and the piece of mesh relative movement in a direction transversely of the piece of mesh to present different portions thereof to said tools to receive links, and means for giving the tools and the piece of mesh relative movement in a direction longitudinally of the piece of mesh.

8. In a machine for making link mesh, the combination of a support for a piece of link mesh, link forming tools, means for moving said mesh and said tools relatively in the direction of the length and in the direction of the width of the piece of mesh, means for feeding wire to said forming tools, means for feeding solder, means for punching discs therefrom and for feeding these discs to the link forming tools, and means for operating said tools to form links on said piece of mesh each intermeshed with a plurality of other links and each comprising a piece of wire having a disc of solder gripped between the ends thereof.

9. In a machine for making link mesh, the combination of a support for a piece of mesh, link forming tools, means for moving the piece of mesh and the tools relatively in the direction of the length and in the direction of the width of the piece of mesh, means for feeding solder and for punching discs therefrom, means for feeding these discs to the tools, and means for operating the tools to form staples, insert the legs of the staples through the links of said piece of mesh, and close the staples to form links with a disc of solder gripped between the ends thereof.

10. In a machine for making link mesh, the combination of a support for a piece of mesh, die members mounted on opposite sides of the mesh so supported, means for feeding solder and for punching discs therefrom, means for feeding these discs to the die members, means for moving the piece of mesh and the die members relatively to present different portions of the piece of mesh to said die members, and means for moving said die members relatively to each other to form links intermeshing with the links of the mesh with a disc of solder gripped between the ends of each link.

11. In a machine for making link mesh, the combination of means for supporting a piece of mesh, die members mounted on opposite sides of the piece of mesh, means for feeding wire to said die members, means for cutting the wire, means for feeding solder and for punching discs therefrom, means for feeding the discs to the die members, means for giving the die members relative movement toward and away from each other to form links of said wire, each link having a disc of solder gripped between the ends thereof and each link meshing with a plurality of the links of said mesh, and means for automatically moving said supporting means and said die members relatively to present different portions of the mesh to said tools and arrange the links formed by said die members in substantially parallel rows.

12. In a machine for making link mesh, the combination of a support for a flat web of mesh from which a free end of the web extends, means for feeding solder and for punching discs therefrom, means for forming links consisting of a piece of wire bent to link form and a disc of solder gripped between the ends of this wire and for connecting these links to the free edge of the web, and means for causing relative movement of the link forming means and the support to cause the links to be successively added in substantially parallel rows.

13. In a machine for making link mesh, the combination of a support for a substantially flat web of mesh, tools for forming links and connecting them to the edge of the web, means for punching discs of solder from a supply and for inserting a disc between the ends of each link as it is formed to be held by these ends, and means for actuating the support to shift the web in a zigzag path during the progress of the work.

14. In a machine for making link mesh, the combination of a carriage, a rotatable support for a piece of mesh mounted on said carriage, means for feeding solder and for punching discs therefrom, link forming tools operable to form a link having a disc of solder inserted between the ends thereof and connect this link to a plurality of other links at the edge of the web, means for giving the carriage and the tools a step by step relative movement in a direction parallel to the axis of the support and for actuating the tools during the periods of rest of this movement, and means for causing a partial rotation of the support when a row of links across the web has been completed.

15. In a machine for making link mesh, the combination of a support for a piece of mesh, a front former and a bending pin located on one side of the piece of mesh, a center former and a rear former located on the other side of the piece of mesh, means for moving the mesh and the formers relatively in the direction of length and in the direction of the width of the piece of mesh, means for feeding solder and for punching discs therefrom, means for feeding these discs, and means for operating the formers and the pin to form staples, interlink these staples with the links of a piece of mesh and form said staples into links having a disc of solder gripped between the ends thereof.

16. In a machine for making link mesh, the combination of a support for a substantially flat web of mesh, means for automatically shifting the web, formers movable toward and away from each other on opposite sides of the plane of the web, means for feeding and severing a length of wire, means for feeding a strip of solder and punching discs therefrom, a pin movable to engage the severed length of wire and bend it into the form of a staple, means for actuating the formers to close the staple to the link form, and means for inserting a disc of solder punched from the strip between the ends of the staple as it is being closed.

17. In a machine for making link mesh, the combination of a support for a substantially flat web of mesh, means for shifting the support laterally, means for feeding and severing a length of wire, means for bending this wire into the staple form, means for feeding a strip of solder and cutting discs therefrom, formers for bending the staple to link form, means for moving the formers toward each other to cause the staple to be bent to link form, means for inserting a disc of solder between the ends of the staple as the latter is being closed so that the disc may be gripped by said ends, and means for moving the bending means below the plane of the formers when the latter are to move together.

18. In a machine for making link mesh, the combination of front and rear cooperating formers, means for engaging and shaping a length of wire in one of said formers, means for punching and feeding a disc of solder to the other of said formers, and means for causing the formers to approach each other and shape the piece of wire into a link with the disc of solder gripped between the ends thereof.

19. In a machine for making link mesh, the combination of front and rear cooperating formers, means for inserting a staple into one of said formers, means for feeding solder, for punching discs therefrom, and for inserting these discs in the path of travel of the other of said formers, means for causing the formers to approach each other and bend the ends of the staple against the disc of solder to form a link with the solder held between the ends thereof, and a center former movable to a position between the formers for supporting the ends of the staple as these ends are being bent together.

20. In a machine for making link mesh, the combination of front and rear formers, means for feeding wire link material to said formers to be bent thereby to link form, and means for punching discs of solder from a supply and inserting a disc of solder in one of said formers in such position that it will be gripped between the ends of each wire being operated on by the formers.

21. In a machine for making link mesh, the combination of front and rear formers, means for mounting the material for the links in one of said formers in the shape of staples, means for actuating said formers to bend said staple to the link form, and means for punching discs of solder from a supply and for placing a disc between the ends of the staple so that it will be gripped by these ends when the staple is closed by the formers.

22. In a machine for making link mesh, the combination of a front former, means for feeding lengths of wire thereto, a bending pin laterally movable to bend such lengths into staples and insert them in the front former, a rear former adapted to cooperate with the front former to bend the staple to the link form, a center former movable to a position between the front and rear formers when the latter are in operative position, and means for punching discs of solder from a supply and for moving a disc to a position between the rear former and the center former so that this disc may lie between the ends of the staple and be gripped thereby as the latter is closed.

23. In a machine for making link mesh, the combination of front and rear formers, means for inserting staples in one of these formers, means for causing the formers to cooperate to bend the staple into link form, a center former mounted on a slide, means for moving the slide to dispose the center former between the front and rear formers when the latter are in operative position, a supply of solder, means for drawing solder therefrom with a step by step movement, means for removing discs of solder therefrom and inserting them in a passage in said slide, and a plunger movable in said passage and operable to dispose the discs of solder between the formers when the latter are in operative position in such position that these discs will lie between the ends of the staples and be gripped thereby as the latter are closed.

24. In a machine for making link mesh, the combination of front and rear cooperating formers having recessed and grooved cooperating ends, a notch in one of these formers opening into the recess, means for inserting a staple into the other former, means for actuating the formers to cause them to close the staple to form a link, a center former mounted on a slide movable to a position between the cooperating ends of the formers, a supply of solder, means for punching discs therefrom and depositing them in the slide, and means for disposing these discs in the notch in the former when the three formers are in operative position whereby each staples as it is closed will grip a disc of solder between its ends.

25. In a machine for making link mesh, the combination of front and rear formers having recessed and grooved ends adapted to cooperate, means for inserting staples in one of said formers, a notch in the recess in the other of said formers equal in depth to the depth of the groove, means for actuating the formers to cause them to bend the staple to link form, a movable slide, a center former carried by this slide and movable by it to a position between the cooperating ends of said formers, a supply of solder, means for feeding the solder with a step by step movement, a plunger having a portion adapted to punch discs from the solder and deposit them in the slide, and a plunger in the slide movable to place these discs into the said notch when the three formers are in cooperating position whereby each staple as it is formed will grip a disc of solder between the ends thereof.

26. In a machine for making link mesh, the combination of a support for a piece of link mesh from which a free end of the mesh extends, tools for forming and applying links to the mesh, an abutment which supports the links to which the new link is being added, means for moving this abutment into and out of operative position, means for punching discs of solder from a supply, and means for placing a disc of solder between the tools at each operation of the latter in such position that this disc may be gripped between the ends of the new link as the latter is formed.

27. A method of making link mesh which comprises supporting a piece of mesh, inserting staples through a plurality of links of the mesh, punching discs of solder from a supply, placing a disc between the ends of each staple, and closing the staples to form links with the solder gripped between the ends thereof.

28. A method of making link mesh which comprises supporting a piece of mesh, inserting staples through a plurality of links of the mesh, punching discs of solder from a supply, feeding these discs, bending the legs of each staple against a disc of solder to form a link with the disc gripped between the ends thereof, and subjecting the mesh to a heat treatment to cause the solder to unite these ends.

29. In a method of making mesh by inserting staples through a plurality of links thereof and closing these staples to form links, the steps of punching discs from a supply of solder, inserting a disc between the ends of each of the staples, closing the ends of the staples to form links in each of which a disc of solder is held, and thereafter heating the mesh to cause the solder to unite the ends of the links.

30. In a machine for making link mesh fabric, the combination of a support for a piece of mesh, a supply of wire, tools for forming links from the wire and intermeshing these links with a plurality of links in the piece of mesh, a supply of solder, means for punching discs from the supply of solder, the punching means being operable to form these discs with their opposite faces concave, means for feeding the discs to the tools in position between the ends of each link as it is formed by the tools, and power driven devices for giving the tools and the support a step-by-step relative movement and for operating the tools in the periods of rest of this step by step movement.

In testimony whereof I affix my signature.

HARRY W. SMITH.